United States Patent
Miyaoh

[19]

[11] Patent Number: 5,988,651
[45] Date of Patent: Nov. 23, 1999

[54] METAL GASKET WITH SEALING BEAD AND BEAD PROTECTING PORTION

[75] Inventor: Yoshio Miyaoh, Tokyo, Japan

[73] Assignee: Ishikawa Gasket Co., Ltd., Tokyo, Japan

[21] Appl. No.: 08/936,194

[22] Filed: Sep. 23, 1997

[30] Foreign Application Priority Data

Oct. 7, 1996 [JP] Japan ................................ 8-266210

[51] Int. Cl.$^6$ .................................................. F16J 15/08
[52] U.S. Cl. ............................................ 277/593; 277/595
[58] Field of Search .................................. 277/593, 594, 277/595, 608

[56] References Cited

U.S. PATENT DOCUMENTS

| | | | |
|---|---|---|---|
| 3,053,544 | 9/1962 | Gorsica | 277/593 |
| 4,721,315 | 1/1988 | Veta | 277/593 |
| 5,601,292 | 2/1997 | Tanaka et al. | 277/593 |
| 5,842,702 | 12/1998 | Vdagawa | 277/593 |

FOREIGN PATENT DOCUMENTS

| | | |
|---|---|---|
| 0 486 150 | 5/1992 | European Pat. Off. . |
| 0 499 551 | 8/1992 | European Pat. Off. . |
| 0 695 896 | 2/1996 | European Pat. Off. . |
| 63-214571 | 9/1988 | Japan . |
| 8-100859 | 4/1996 | Japan . |

OTHER PUBLICATIONS

Patent Abstracts of Japan, vol. 11, No. 111 (M–578), Apr. 8, 1987, JP61–255253 (Nippon Metal) Nov. 12, 1986.

*Primary Examiner*—Anthony Knight
*Assistant Examiner*—John L. Beres
*Attorney, Agent, or Firm*—Kanesaka & Takeuchi

[57] ABSTRACT

A metal gasket of the invention is used for a cylinder head gasket or a pipe connecting gasket. The gasket is basically formed of a single metal plate having a base portion extending substantially throughout an entire area to be sealed, and includes a bead protecting portion extending outwardly from the front surface and a sealing bead adjacent to the bead protecting portion. The bead protecting portion and the sealing bead are formed in the metal plate. The bead protecting portion has no substantial compressibility, but the sealing bead has a compressibility. Thus, when the metal plate is compressed, the bead protecting portion provides a surface pressure without substantial resiliency, and the sealing bead provides a surface pressure with resiliency and is protected from being completely compressed by the bead protecting portion. The gasket can be made thin.

6 Claims, 3 Drawing Sheets

METAL GASKET WITH SEALING BEAD AND BEAD PROTECTING PORTION

BACKGROUND OF THE INVENTION AND RELATED ART STATEMENT

The present invention relates to a metal gasket with a sealing bead and a bead protecting portion, in particular a single metal plate with a compressible sealing bead and a bead protecting portion for protecting the sealing bead. The invention can be applied to gaskets for sealing a narrow area as well as a wide area, such as a pipe connecting gasket and a cylinder head gasket for an internal combustion engine.

The engines have been developed to provide high power with light weight. Since metal gaskets or metal laminate gaskets are strong against high pressure and high temperature, the metal gaskets have been used widely for the engines. To provide high power with light weight engine, the gasket must be made thin, and seal around the cylinder bores tightly.

If the areas around the cylinder bores of the engine are not properly sealed, combustion gases leak from the cylinder bores, so that the maximum power of the engine can not be obtained. In order to properly seal around the cylinder bores, various metal laminate gaskets have been proposed. For example, one or more metal plates have sealing beads around the cylinder bores, and protecting portions for preventing deformation or creep relaxation of the beads are formed near the sealing beads.

For example, a metal laminate gasket as disclosed in Japanese Patent Publication (KOKAI) No. 8-100859 is formed of three metal plates laminated together, wherein upper and lower metal plates have beads around holes to be sealed, and a middle plate thicker than the upper and lower plates includes bead protecting portions, which do not deform when the gasket is compressed. The beads extend toward the middle plate, and the bead protecting portions are located at both sides of each bead. Since the beads are not completely compressed by the bead protecting portions when the gasket is tightened, the beads seal around the holes without creep relaxation.

The above gasket is formed of three plates, or it requires at least two plates, one plate for the bead and the other plate for the bead protecting portion. Since the gasket becomes relatively thick, it is possible to use such a gasket as a large cylinder head gasket, but the gasket is not suitable as a small gasket.

Also, since the above gasket is formed of three metal plates with different functions, the gasket operates as a combination of the three metal plates. Therefore, one of the metal plates can not be selected and used as a single plate gasket because of providing insufficient or improper sealing around the hole.

On the other hand, in some conventional gaskets, an edge portion of a metal plate may be turned over a base of the metal plate to form a seal portion or a bead protecting portion around the edge portion. However, in this gasket, since the bead protecting portion can be formed only at the edge portion of the gasket, the structure of the gasket, i.e. locations of the bead and the bead protecting portion, is limited.

The present invention has been made in view of the above conventional gaskets, and an object of the invention is to provide a metal gasket, which is thin and can securely seal around a hole while protecting a bead by a bead protecting portion.

Another object of the invention is to provide a metal gasket as stated above, wherein a sealing bead and a bead protecting portion for the sealing bead can be formed in desired portions in a metal plate.

A further object of the invention is to provide a metal gasket as stated above, which is suitable for sealing a small area like a pipe connecting gasket as well as a large area like a cylinder head gasket.

Further objects and advantages of the invention will be apparent from the following description of the invention.

SUMMARY OF THE INVENTION

A metal gasket of the invention is used for an internal combustion engine, as a cylinder head gas or a pipe connecting gasket. The gasket is formed of a metal plate for constituting the metal gasket, which includes a base portion extending substantially throughout an entire area to be sealed.

The gasket includes a bead protecting portion extending outwardly from a front surface of the base portion, and a sealing bead adjacent to the bead protecting portion. The bead protecting portion is formed in the metal plate to have no substantial compressibility, while the sealing bead has a compressibility. Thus, when the metal plate is compressed, the bead protecting portion provides a surface pressure without substantial resiliency, and the sealing bead provides a surface pressure with resiliency. Since the sealing bead is protected from being completely compressed by the bead protecting portion, creep relaxation of the sealing bead is prevented.

In the metal gasket of the invention, since the bead protecting portion and the sealing bead are formed in one metal plate, the metal plate can operate as a single plate gasket with full functions. Also, the metal gasket can be relatively easily and economically formed.

In the invention, the bead protecting portion is a non-compressible projection formed in a middle of the metal plate without turning an edge of the metal plate. Also, the bead protecting portion and the sealing bead surround a hole for sealing the same. Further, a stepped portion may be formed in the metal plate to surround the sealing bead.

The bead protecting portion may completely surround the hole without interruption. In this case, the bead protecting portion also seals around the hole. On the other hand, the bead protecting portion may surround the hole with interruptions.

In the gasket of the invention, the metal plate with the bead protecting portion and the sealing bead can be used as a single plate gasket, but the metal plate may be laminated with one or more metal plates to form a metal laminate gasket.

DETAILED DESCRIPTION OF PREFERRED EMBODIMENTS

With reference to FIGS. 1–4, a first embodiment A of a metal gasket will be explained. The gasket A is a cylinder head gasket, and includes a plurality of cylinder bores Hc, water holes Hw, oil holes Ho (not shown), bolt holes (Hb), push rod holes Hp, and so on, as in the conventional gasket.

The gasket A is formed of a single metal plate A10, preferably a stainless steel plate, extending throughout an entire area to be sealed. The metal plate A10 includes a base portion A10a, a bead protecting portion A11 situated around the cylinder bore Hc, a bead A12 located around the bead protecting portion A11, and a stepped bead A13 located around the water hole Hw. The base portion A10a substantially covers the metal plate A10 except the bead protecting portion A11, the bead A12 and the stepped bead A13.

The bead protecting portion A11 projects outwardly from an upper surface of the plate A10, and is made thick so that the bead protecting portion A11 is not substantially compressed when the gasket A is tightened.

Figure 1:
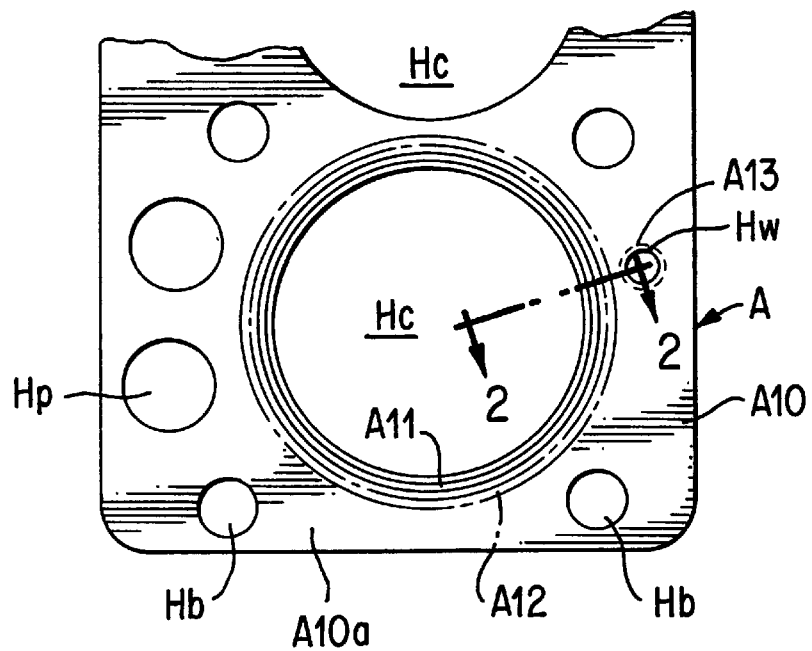
FIG. 1 is an explanatory plan view of a part of a first embodiment of a cylinder head gasket according to the present invention.
Figure 2:
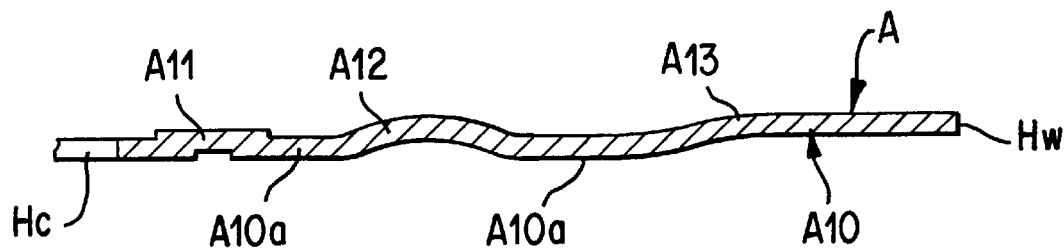
FIG. 2 is an enlarged sectional view taken along line 2—2 in FIG. 1.
Figure 3A:
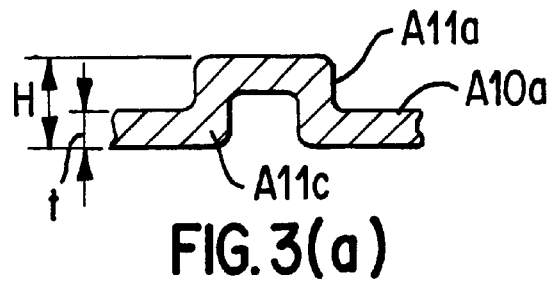
FIGS. 3(*a*)–3(*c*) are sectional views for showing steps of preparing a bead protecting portion.
Figure 3B:
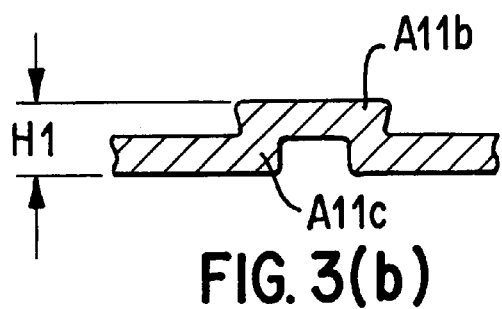
Figure 3C:
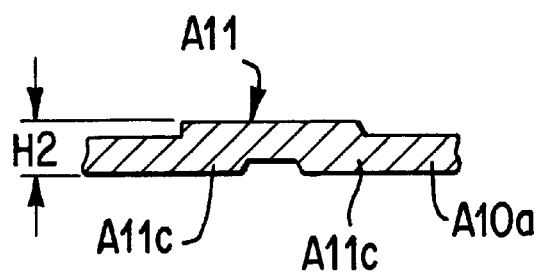

FIGS. 3(a)–3(c) show the process for forming the bead protecting portion A11. At first, a projection A11a is formed by a press to project from the outer surface of the plate A10 (FIG. 3(a)) for the height H. Then, the projection A11a is pressed to the thickness H1 to form a projection A11b, which is again pressed to the thickness H2.

When the bead protecting portion A11 is formed by compressing the projection A11a from the thickness H as shown in FIG. 3(a) to the thickness H2 as shown FIG. 3(c) through the thickness H1 (FIG. 3(b)), foot portions A11c having the thickness t as in the metal plate A10 increase the thickness step by step to increase the strength thereof. In this compression process, the foot portions A11c receive processing deformation as well, so that the foot portions A11c have sufficient strength. Therefore, when the gasket A is compressed in use, the bead protecting portion A11 is not substantially compressed any more, i.e. non-compressible, to thereby protect the bead A12.

The bead A12 is formed around the bead protecting portion A11, and the stepped bead A13 is formed around the water hole Hw. The bead A12 and the stepped bead A13 are formed by a press, as in the conventional method.

Figure 4:
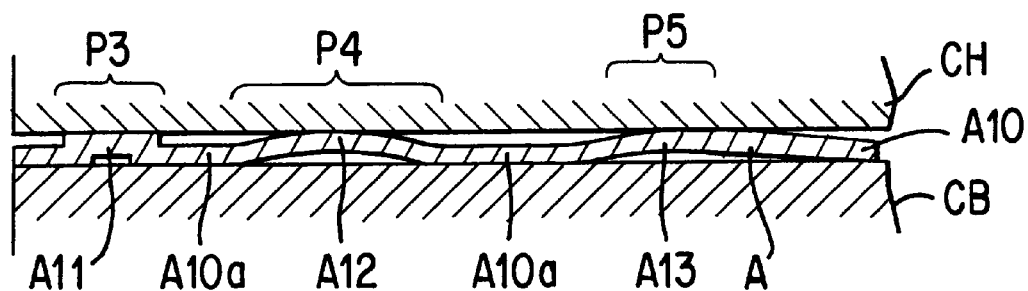
FIG. 4 is an explanatory sectional view of the gasket when the gasket is compressed.

When the gasket A is situated between a cylinder head CH and a cylinder block CB and is tightened as shown in FIG. 4, the bead protecting portion A11 is not substantially compressed, and provides a surface pressure P3. The bead A12 is compressed to the height H2 of the bead protecting portion A11, and is not compressed further. Thus, the bead protecting portion A11 operates to protect the bead A12 from complete flattening, i.e. creep relaxation of the bead A12 and to securely seal around the cylinder bore Hc. The bead A12 provides resilient surface pressure P4. Also, the stepped bead A13 provides resilient surface pressure P5 to seal around the water hole Hw.

Figure 5:
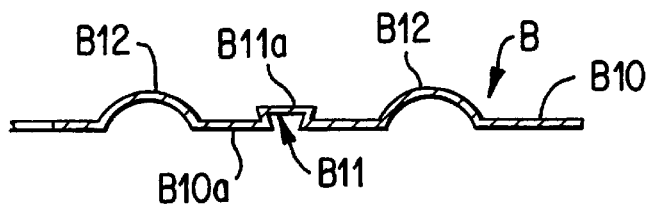
FIG. 5 is an enlarged sectional view, similar to FIG. 2, for showing a second embodiment of a cylinder head gasket of the invention.

FIG. 5 shows a metal gasket B used as a cylinder head gasket, similar to the gasket A. FIG. 5, however, shows only the portion around the cylinder bore Hc, excluding the structure around the water hole Hw.

The gasket B is formed of one metal plate B10, and includes a base portion B10a, a bead protecting portion B11 situated around the cylinder bore Hc, and two beads B12 located on both sides of the bead protecting portion B11. The beads B12 and the bead protecting portion B11 surround the cylinder bore Hc to securely seal therearound.

In the gasket B, the bead protecting portion B11 has a shape similar to an inverse trapezoid, and a compressible space therein. When the gasket B is tightened, therefore, the bead protecting portion B11 is slightly compressed until an upper portion B11a is fully pressed onto the base portion B10a. The bead protecting portion B11 is not completely flattened to the thickness same as the base portion B10a. The beads B12 are compressed to the thickness of the bead protecting portion B11 to seal around the cylinder bore Hc. In the gasket B, when the gasket is tightened, the beads B12 resiliently seal around the cylinder bore Hc, while the bead protecting portion B11 seals without resiliency.

Figure 6A:
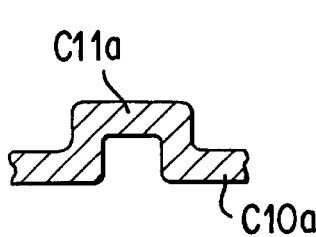
FIGS. 6(a)–6(c) are sectional views for showing steps of preparing a different bead protecting portion.

In the gasket A, the bead protecting portion A11 has a rectangular shape and is formed as shown in FIGS. 3(a)–3(c). However, the gasket A may have a bead protecting portion C11 formed as shown in FIGS. 6(a)–6(c).

Figure 6B:
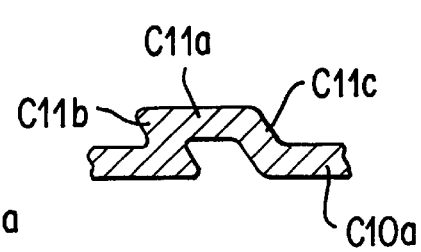
Figure 6C:
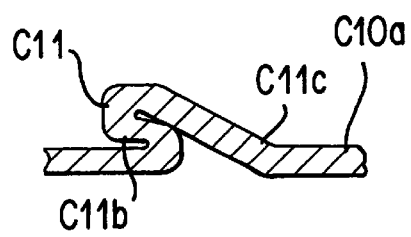

Namely, after a projection C1a is formed on a metal plate C10, the projection C11a is pushed diagonally and leftwardly as shown in FIG. 6(b), and then the projection C11a is compressed downwardly. Thus, one leg or first side C11b is disposed together with a middle portion, on a base portion C10a at the first side, and the other leg or second side C11c extends diagonally from the middle portion to the base portion at the second side to thereby form the bead protecting portion C11. The second side has a length greater than that of the first side. Since a part of the bead protecting portion C11 is disposed on the base portion C10a, even if high tightening pressure is applied to the bead protecting portion C11, the thickness of the bead protecting portion C11 does not reduce. The bead protecting portion C11 is useful for a gasket which receives a high tightening pressure.

Figure 7:
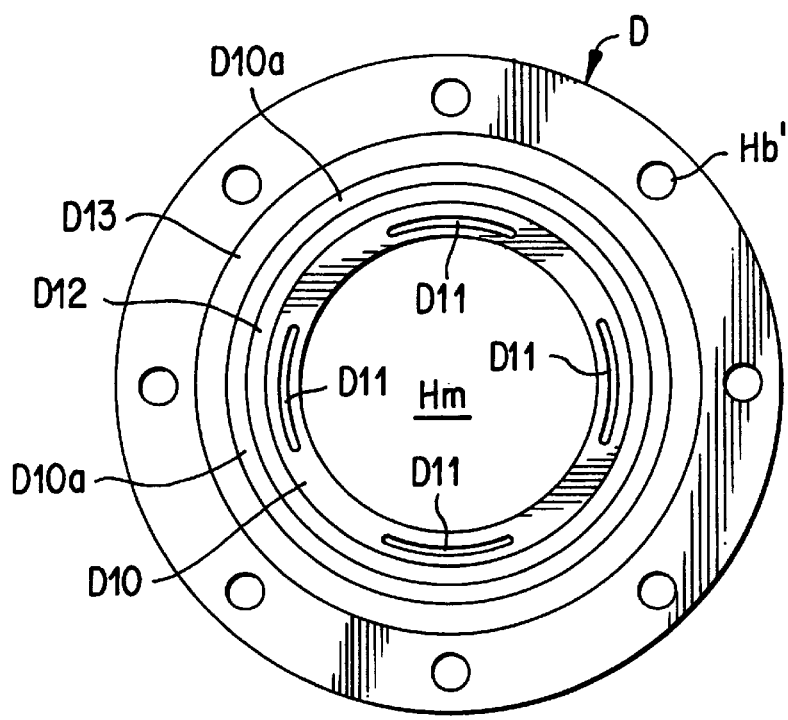
FIG. 7 is a plan view of a pipe connecting gasket prepared according to the present invention.

FIG. 7 is a third embodiment of a metal gasket D of the invention. The gasket D is used for connecting a pipe, such as an exhaust pipe, and includes a hole Hm, and a plurality of bolt holes Hb'. The gasket D is formed of a single metal plate D10, and includes a base portion D10a, bead protecting portions D11 situated around the hole Hm, a bead D12 located around the bead protecting portions D11, and a stepped bead D13 located around the bead D12, similar to the gasket A. In the gasket D, however, the bead protecting portions D11 are not continuous, and spaced apart from each other. Namely, although the bead protecting portions D11 are formed on an imaginary line concentrically to the hole Hm, the bead protecting portions D11 are interrupted. When a section line extending radially outwardly from a center of the hole Hm and passing through one of the bead protecting portions D11 is taken, the section appears as in FIG. 2.

In the gasket D, the bead protecting portions D11 are not continuous, but the bead D12 located outside the bead protecting portions D11 is not completely compressed when the gasket D is tightened. Therefore, the bead protecting portions D11 operate as in the bead protecting portion A11. Although the bead protecting portions D11 do not seal around the hole Hm unlike the gasket A, since the stepped bead D13 is formed around the bead D12, the gasket D substantially completely seals around the hole Hm.

In the gasket of the invention, the gasket is formed of a single plate, but the non-compressible bead protecting portion and the compressible bead are formed on the single metal plate. The non-compressible bead protecting portion prevents the sealing bead from being completely compressed. Therefore, the sealing bead securely seals around the hole without substantial creep relaxation. In case the non-compressible bead protecting portion is continuously formed around the hole, the bead protecting portion also seals around the hole.

The gasket is useful when it is formed of the single plate. However, the single plate gasket of the invention may be combined with one or more plates to constitute a metal laminate gasket.

While the invention has been explained with reference to the specific embodiments of the invention, the explanation is illustrative, and the invention is limited only by the appended claims.

What is claimed is:

1. A metal gasket comprising:
   a metal plate for constituting the metal gasket, said metal plate having a base portion extending substantially throughout an entire area to be sealed and a front surface on the base portion,
   a bead protecting portion extending outwardly from the front surface and having first and second sides and a middle portion between the first and second sides, said first side and the middle portion being disposed on the base portion at the first side to thereby form the bead protecting portion without substantial compressibility, said second side having a length greater than that of the first side and extending diagonally from the middle portion to the base portion at the second side, and
   a sealing bead formed in the metal plate adjacent to the bead protecting portion and having a compressibility so that when the metal plate is compressed, said bead protecting portion provides a surface pressure without substantial resiliency, and said sealing bead provides a surface pressure with resiliency and is protected from being completely compressed by the bead protecting portion.

2. A metal gasket according to claim 1, wherein said metal plate has a hole therein, said bead protecting portion and the sealing bead surrounding the hole for sealing around the hole.

3. A metal gasket according to claim 2, wherein said bead protecting portion and the sealing bead are arranged concentrically relative to the hole such that the bead protecting portion is located closer to the hole.

4. A metal gasket according to claim 3, further comprising a stepped portion formed in the metal plate to surround the sealing bead.

5. A metal gasket according to claim 3, wherein said bead protecting portion completely surrounds the hole without interruption to securely seal around the hole.

6. A metal gasket according to claim 3, wherein said bead protecting portion surrounds the hole with interruptions in said bead protecting portion.

* * * * *